United States Patent
Shiraishi

(10) Patent No.: US 7,531,474 B2
(45) Date of Patent: *May 12, 2009

(54) OPTICAL GLASS, SHAPED GLASS MATERIAL FOR PRESS-MOLDING, OPTICAL ELEMENT AND PROCESS FOR PRODUCING OPTICAL ELEMENT

(75) Inventor: Kouichiro Shiraishi, Iida (JP)

(73) Assignee: Hoya Corporation, Tokyo (JP)

( * ) Notice: Subject to any disclaimer, the term of this patent is extended or adjusted under 35 U.S.C. 154(b) by 320 days.

This patent is subject to a terminal disclaimer.

(21) Appl. No.: 11/038,469

(22) Filed: Jan. 21, 2005

(65) Prior Publication Data

US 2005/0164862 A1 Jul. 28, 2005

(30) Foreign Application Priority Data

Jan. 23, 2004 (JP) ............................. 2004-016057

(51) Int. Cl.
*C03C 3/21* (2006.01)
(52) U.S. Cl. ..................... 501/46; 501/901; 501/45; 501/47; 501/48
(58) Field of Classification Search ................... 501/46, 501/901, 45, 47, 48
See application file for complete search history.

(56) References Cited

U.S. PATENT DOCUMENTS

| | | | | |
|---|---|---|---|---|
| 4,115,131 | A * | 9/1978 | Ishibashi et al. | 501/42 |
| 6,875,714 | B2 * | 4/2005 | Izuki | 501/45 |
| 6,995,101 | B2 * | 2/2006 | Zou et al. | 501/46 |
| 7,060,640 | B2 * | 6/2006 | Ogino et al. | 501/45 |
| 2002/0042337 | A1 * | 4/2002 | Zou et al. | 501/45 |
| 2003/0220182 | A1 * | 11/2003 | Izuki | 501/46 |
| 2004/0018933 | A1 * | 1/2004 | Ogino et al. | 501/45 |
| 2005/0049132 | A1 * | 3/2005 | Shiraishi | 501/46 |
| 2005/0113239 | A1 * | 5/2005 | Miyata et al. | 501/45 |
| 2005/0164862 | A1 * | 7/2005 | Shiraishi | 501/45 |
| 2006/0058171 | A1 * | 3/2006 | Izuki | 501/47 |
| 2006/0081010 | A1 * | 4/2006 | Zou et al. | 65/385 |
| 2007/0027016 | A1 * | 2/2007 | Ogino et al. | 501/45 |

FOREIGN PATENT DOCUMENTS

| | | | |
|---|---|---|---|
| JP | 6-345481 | | 12/1994 |
| JP | 06345481 | A * | 12/1994 |
| JP | 08104537 | A * | 4/1996 |
| JP | 08157231 | A * | 6/1996 |
| JP | 2747796 | B2 * | 5/1998 |
| JP | 2002173336 | A * | 6/2002 |
| JP | 2003212592 | A * | 7/2003 |

OTHER PUBLICATIONS

Machine Translation of JP 08-104537.*
Derwent Abstract 2003-598736, English language abstract of JP 2003-212592 A.*
Derwent Abstract 1996-254991, English language abstract of JP 08-104537 A.*
Derwent Abstract 1995-070067, English language abstract of JP 2747964 B2.*

* cited by examiner

*Primary Examiner*—Karl E Group
*Assistant Examiner*—Elizabeth A Bolden
(74) *Attorney, Agent, or Firm*—Nixon & Vanderhye P.C.

(57) ABSTRACT

Disclosed is an optical glass having high-refractivity and high-dispersion properties and having little coloring, said glass containing $P_2O_5$, $Nb_2O_5$ and $TiO_2$ as glass components, containing $Sb_2O_3$ in an amount of over 0% by weight but not more than 1% by weight based on the total content of the glass components excluding $Sb_2O_3$, having a refractive index (nd) of 1.91 or more and an Abbe's number (vd) of 21 or less and having a light transmittance that comes to be 70% at a wavelength of 500 nm or less.

6 Claims, No Drawings

OPTICAL GLASS, SHAPED GLASS MATERIAL FOR PRESS-MOLDING, OPTICAL ELEMENT AND PROCESS FOR PRODUCING OPTICAL ELEMENT

TECHNICAL FIELD

The present invention relates to an optical glass, a shaped glass material for press-molding, an optical element and a process for producing the optical element. More specifically, the present invention relates to an optical glass having high-refractivity and high-dispersion properties and having little coloring, a shaped glass material formed of the above optical glass, an optical element formed of the above optical glass and a process for producing the above optical element.

TECHNICAL BACKGROUND

In recent years, a demand for optical glasses having high-refractivity and high-dispersion properties is increasing year after year. As such a glass, there is known an optical glass having a phosphate-based glass composition as a base material and containing a relatively large amount of components that give a high refractive index, such as $TiO_2$ and the like (for example, see JP-A-6-345481).

However, the above glass contains a relatively large amount of components that give a high refractive index such as $TiO_2$ and the like while having a phosphate-based glass composition as a base, and as a result, the glass is liable to be colored and has a problem from the viewpoint of a color degree. In the invention of the above JP-A-6-345481, attempts are made to heat-treat the optical glass for improving the glass with regard to the coloring. In this case, however, a heat-treatment step is required, and the procedure therefore inevitably comes to be complicated. Further, there is another problem that it is difficult to impart the entire glass with a uniform color degree.

DISCLOSURE OF THE INVENTION

Problems to be Solved by the Invention

Under the circumstances, it is an object of the present invention to provide an optical glass having high-refractivity and high-dispersion properties and having little coloring, a shaped glass material formed of the above optical glass for press molding, an optical element formed of the above optical glass and a process for producing the above optical element.

Means to Solve the Problems

For achieving the above object, the present inventors have made diligent studies and have found that the above object can be achieved by an optical glass having a specific composition and having a light transmittance that comes to be 70% at a certain wavelength value or smaller. On the basis of this finding, the present invention has been completed.

That is, the present invention provides:

(1) an optical glass comprising $P_2O_5$, $Nb_2O_5$ and $TiO_2$ as glass components, containing $Sb_2O_3$ in an amount of over 0% by weight but not more than 1% by weight based on the total content of the glass components excluding $Sb_2O_3$, having a refractive index (nd) of 1.91 or more and an Abbe's number (vd) of 21 or less and having a light transmittance that comes to be 70% at a wavelength of 500 nm or less (to be referred to as "optical glass I" hereinafter), (2) an optical glass as recited in the above (1), which contains $WO_3$ and $Bi_2O_3$ as optional components and has a $TiO_2/(Nb_2O_5+TiO_2+WO_3+Bi_2O_3)$ weight ratio of 0.11 or more, (3) an optical glass as recited in the above (1) or (2), which contains, by weight %, 17 to 30% of $P_2O_5$, 30 to 60% of $Nb_2O_5$ and over 0% but not more than 20% of $TiO_2$, (4) an optical glass containing $P_2O_5$, $Nb_2O_5$ and $TiO_2$ as essential components, containing $WO_3$ and $Bi_2O_3$ as optional components, and having a glass composition wherein the contents of said components by weight % are

| | |
|---|---|
| $P_2O_5$ | 17-30% |
| $Nb_2O_5$ | 30% or more |
| $TiO_2$ | over 0% but not more than 20%, | provided that the $Nb_2O_5/(Nb_2O_5+TiO_2+WO_3+Bi_2O_3)$ weight ratio is 0.11 or more,
and $Sb_2O_3$ is added in an amount of over 0% by weight but not more than 1% by weight based on the total content of the glass components excluding $Sb_2O_3$,
the optical glass having a refractive index (nd) of 1.91 or more and an Abbe's number (vd) of 21 or less (to be referred to as "optical glass II" hereinafter), (5) an optical glass as recited in the above (4), which has a light transmittance that comes to be 70% at a wavelength of 500 nm or less, (6) an optical glass as recited in the above (3) or (4), which further contains, by weight %, 0 to 3% of $SiO_2$, 1 to 8% of $B_2O_3$, 0 to 12% of $Na_2O$, 0 to 10% of $K_2O$, over 0% but not more than 25% of BaO and 0 to 5% of ZnO, (7) an optical glass as recited in any one of the above (1) to (6), which contains $Sb_2O_3$ in an amount of over 0.1% by weight but not more than 1% by weight based on the total content of the glass components excluding $Sb_2O_3$, (8) an optical glass as recited in any one of the above (1) to (7), which has a light transmittance that comes to be 70% at a wavelength of 500 nm or less in a state where the glass in a molten state is molded and cooled, (9) a shaped glass material for press-molding, which is formed of the optical glass recited in any one of the above (1) to (8) and is to be press-molded,

(10) an optical element formed of the optical glass recited in any one of the above (1) to (8), and

(11) a process for producing an optical element, which comprises softening the shaped glass material for press-molding recited in the above (9) under heat and press-molding the same.

EFFECT OF THE INVENTION

According to the present invention, there can be provided an optical glass having high-refractivity and high-dispersion properties and having little coloring or decreased coloring compared with other glasses having a similar refractive index, a shaped glass material formed of the above optical glass for obtaining an optical element by press molding, an optical element formed of the above optical glass and a process for producing the above optical element.

PREFERRED EMBODIMENTS OF THE INVENTION

The optical glass of the present invention includes two embodiments, the optical glass I and the optical glass II. The optical glass I will be explained first.

The optical glass I is a glass containing $P_2O_5$, $Nb_2O_5$ and $TiO_2$ as essential components, and the glass contains $Sb_2O_3$ in an amount of over 0% by weight but not more than 1% by weight based on the total amount of the glass components excluding $Sb_2O_3$, having a refractive index (nd) of 1.91 or more and an Abbe's number (vd) of 21 or less and having a light transmittance that comes to be 70% at a wavelength of 500 nm or less.

The above light transmittance refers to a spectral transmittance obtained when a glass sample having surfaces in parallel with each other and being polished so that the glass sample has a thickness of 10.0±0.1 mm is provided and light is allowed to enter the above polished surface vertically. The above polishing of the surfaces means that the surfaces are flattened and smoothened into a state in which the roughness of the surfaces is sufficiently small relative to the wavelength of a measurement wavelength region. The above spectral transmittance is measured in the wavelength region of 280 to 700 nm. When the wavelength at which the light transmittance comes to be 5% is supposed to be $\lambda_5$, the light transmittance increases as the wavelength is increased from $\lambda_5$, and when the light transmittance reaches at least 70%, a high transmittance of at least 70% is maintained until the wavelength comes to be 700 nm. When the wavelength at which the light transmittance comes to be 70% is supposed to be $\lambda_{70}$, the $\lambda_{70}$ is required to be 500 nm or less, and it is preferably 490 nm or less. While the lower limit of the $\lambda_{70}$ is not specially limited, preferably, the $\lambda_{70}$ is in the range that includes wavelengths of 350 nm and greater, for accomplishing improvements in properties other than the light transmittance.

When the compositional range of the optical glass is as described above, the optical glass can have a remarkably high refractive index (nd) of 1.91 or more. However, when a $P_2O_5$-containing glass contains a high-refractivity component such as $Nb_2O_5$ or $TiO_2$, such a component is reduced to generate a color of brown to purple, so that the light transmittance is decreased. It is essential to incorporate $Sb_2O_3$ for decreasing this phenomenon and obtaining the above light transmittance. However, when the content of $Sb_2O_3$ is increased, the glass is colored due to absorption by $Sb_2O_3$. The content of $Sb_2O_3$ is therefore limited to the above range of over 0% by weight but not more than 1% by weight based on the total amount of the glass components excluding $Sb_2O_3$. The content of $Sb_2O_3$ based on the total content of glass components excluding $Sb_2O_3$ is preferably 0.01 to 1% by weight, more preferably over 0.1% by weight but not more than 1% by weight, still more preferably 0.11 to 1% by weight, yet still more preferably 0.11 to 0.7% by weight, particularly preferably 0.11 to 0.5% by weight. As described above, the content of $Sb_2O_3$ refers to a content calculated on the basis of the total content of all of glass components excluding $Sb_2O_3$.

The optical glass I of the present invention has high added values of remarkably high-refractivity and high-dispersion properties, and for further improving these added values, the refractive index (nd) is preferably 1.92 or more. Further, the Abbe's number (vd) of the optical glass I is preferably less than 20, more preferably 19 or less, still more preferably 18.5 or less.

While the refractive index (nd) does not have any specific upper limit value determined, the upper limit of the refractive index (nd) is preferably determined to be 2.01 or less, more preferably determined to be 2.00 or less, for maintaining high qualities of the optical glass and enabling stable production. Further, while the Abbe's number (vd) has no specific lower limit value determined, the Abbe's number (vd) is determined to be 17 or more, more preferably determined to be 17.5 or more from the same viewpoints.

Desirably, the optical glass I of the present invention does not contain PbO and $As_2O_3$. PbO can increase the refractive index of the glass, but has an environmental problem. $As_2O_3$ has high defoaming or clarifying effect and also has a high effect on the prevention of coloring of the glass, but has an environmental problem. In the present invention, therefore, it is desirable to preclude these substances from the glass.

Next, the optical glass II of the present invention contains $P_2O_5$, $Nb_2O_5$ and $TiO_2$ as essential components, contains $WO_3$ and $Bi_2O_3$ as optional components, and has a glass composition wherein the contents of the essential components by weight % are

| | |
|---|---|
| $P_2O_5$ | 17-30% |
| $Nb_2O_5$ | 30% or more |
| $TiO_2$ | over 0% but not more than 20%, | provided that the $TiO_2/(Nb_2O_5+TiO_2+WO_3+Bi_2O_3)$ weight ratio is 0.11 or more, and $Sb_2O_3$ is added in an amount of over 0% by weight but not more than 1% by weight based on the total amount of the glass components excluding $Sb_2O_3$, and the optical glass has a refractive index (nd) of 1.91 or more and an Abbe's number (vd) of 21 or less.

Concerning the amount of $Sb_2O_3$, the refractive index (nd) and Abbe's number (vd) and the light transmittance in the optical glass II, those explanations which are given with regard to the above optical glass I including preferred ranges thereof can be applied.

The components of the optical glass II and reasons for limitations of contents thereof will be explained below. A content shown by % will stand for a content to be shown by weight % hereinafter. The following explanations on the compositional ranges in the optical glass II are similarly applied to the preferable compositional ranges in the optical glass I.

$P_2O_5$ is essential as a glass-forming component in a phosphate glass. A phosphate glass has characteristic features that it can be melted at a low temperature as compared with a silicate glass and that it has a high transmittance in a visible region. It is therefore required to incorporate at least 17% of $P_2O_5$. On the other hand, when the content of $P_2O_5$ exceeds 30%, it is difficult to obtain any high-refractivity property. The content of $P_2O_5$ is therefore adjusted to the range of 17 to 30%. The content of $P_2O_5$ is preferably in the range of 18 to 28%, more preferably 21 to 28%.

$Nb_2O_5$ is an essential component for obtaining high-refractivity and high-dispersion properties, and it has the effect of improving a glass in chemical durability. When the content of $Nb_2O_5$ is less than 30%, it is no longer possible to obtain the intended high-refractivity and high-dispersion properties, so that $Nb_2O_5$ is incorporated in an amount of 30% or more. Further, when the content of $Nb_2O_5$ exceeds 60%, a glass tends to be poor in devitrification resistance, so that the content thereof is adjusted to 60% or less. The content of $Nb_2O_5$ is preferably in the range of 32 to 57%, more preferably 40 to 57%, still more preferably 45 to 57%.

$TiO_2$ is incorporated since it is an essential component for obtaining the intended high-refractivity and high-dispersion properties and is highly effective for improving a glass in chemical durability. When the content of $TiO_2$ exceeds 20%, a glass is degraded in devitrification resistance, and a glass is extremely degraded in color degree. The content of $TiO_2$ is therefore limited to over 0% but not more than 20%. The content of $TiO_2$ is preferably in the range of 0.5 to 19%, more preferably 2 to 18%.

$WO_3$ and $Bi_2O_3$ are optional components for materializing desired optical constants of some high-refractivity and high-dispersion glasses. In the present invention, the object of the present invention can be achieved without introducing $WO_3$ or $Bi_2O_3$ or without introducing $WO_3$ and $Bi_2O_3$. When $WO_3$ is introduced, the content thereof is preferably in the range of 0 to 12%, more preferably 0 to 11%. When $Bi_2O_3$ is introduced, the content thereof is preferably in the range of 0 to 15%, preferably 0 to 10%.

For obtaining desired optical constants, particularly, the high-refractivity property, and obtaining a glass having little coloring, the weight ratio of $TiO_2$ to the total content of $Nb_2O_5$, $TiO_2$, $WO_3$ and $Bi_2O_3$ ($TiO_2/(Nb_2O_5+TiO_2+WO_3+Bi_2O_3)$) is adjusted to 0.11 or more. That is, $Sb_2O_3$ having the predetermined content and $Nb_2O_5$, $TiO_2$, $WO_3$ and $Bi_2O_3$ having the contents that are determined on the above relationship are co-present in the optical glass II, so that the wavelength at which the light transmittance is 70% can be adjusted to 500 nm or less. The $TiO_2/(Nb_2O_5+TiO_2+WO_3+Bi_2O_3)$ weight ratio is preferably 0.11 or greater, more preferably 0.14 or greater, still more preferably 0.15 or greater.

BaO is a component that highly effectively improves a glass in devitrification resistance. Further, it is a component that increases the refractive index and does not degrade the color degree even when introduced in a large amount. The content of BaO can be adjusted to over 0% but not more than 25%. The content of BaO is preferably 0.2 to 20%, more preferably 0.2 to 10%, still more preferably 0.2 to 6%, yet more preferably 0.2 to 5%.

When added in a proper amount, $Li_2O$, $Na_2O$ and $K_2O$ can decrease the melting temperature of a glass and can decrease the liquidus temperature (LT) of the glass. However, when the total content of $Li_2O+Na_2O+K_2O$ exceeds 15%, it is difficult to obtain the intended high-refractivity property. The total content of $Li_2O+Na_2O+K_2O$ is therefore preferably 15% or less, more preferably in the range of 2 to 12%, still more preferably 2 to 10%.

The content of $Li_2O$ is preferably 0 to 3%, more preferably 0 to 1%. The content of $Na_2O$ is preferably 0 to 12%, more preferably 0 to 10%, still more preferably 0.1 to 10%. The content of $K_2O$ is preferably 0 to 10%, more preferably 0 to 9%, still more preferably 0.1 to 9%. As an alkali metal oxide, it is preferred to incorporate $Na_2O$ alone, $K_2O$ alone or both $Na_2O$ and $K_2O$. It is more preferred to incorporate $K_2O$ alone or both $Na_2O$ and $K_2O$. It is still more preferred to incorporate both $Na_2O$ and $K_2O$.

When added in a proper amount, CaO, SrO and ZnO as optional components highly effectively decrease the liquidus temperature (LT) of a glass and improve the glass in devitrification resistance. When CaO, SrO and ZnO are introduced to excess, however, it is difficult to obtain the intended high-refractivity and high-dispersion properties. Therefore, the content of CaO is adjusted preferably to the range of 0 to 6%, more preferably to the range of 0 to 3%. The content of SrO is preferably adjusted to the range of 0 to 6%, more preferably to the range of 0 to 3%. The content of ZnO is preferably adjusted to the range of 0 to 5%, more preferably to the range of 0 to 3%.

$B_2O_3$ has a characteristic feature that it improves a glass in devitrification resistance when added in a proper amount. When a proper amount of $B_2O_3$ is incorporated into an optical glass containing $P_2O_5$, $Nb_2O_5$ and $TiO_2$, the glass is remarkably improved in devitrification resistance. It is therefore preferred to incorporate $B_2O_3$ in an amount of over 0%. However, when the content of $B_2O_3$ exceeds 8%, it is difficult to obtain any high-refractivity property. It is therefore preferred to adjust the content of $B_2O_3$ to the range of 1 to 8%. The content of $B_2O_3$ is more preferably 1 to 6.5%.

The above glass may contain $SiO_2$ and $ZrO_2$ as optional components. Both $SiO_2$ and $ZrO_2$ work to decrease the coloring and improve the devitrification resistance when added in a small amount each. When they are added to excess, it is difficult to obtain the intended high-refractivity property. Therefore, the content of $SiO_2$ is preferably adjusted to 0 to 3%, and the content of $ZrO_2$ is preferably adjusted to 0 to 4%. More preferably, the content of $SiO_2$ is 0 to 2%, and the content of $ZrO_2$ is 0 to 2%.

Components such as $La_2O_3$, $Y_2O_3$, $Gd_2O_3$, $Ta_2O_5$, MgO, $Cs_2O$, etc., may be also incorporated so long as the object of the present invention is not impaired. However, the object of the present invention can be achieved without introducing any one of these components.

Preferred contents of the above components can be combined, and the above $Sb_2O_3$ can be added to a glass composition having such preferred contents of the above components.

Examples of preferred compositional ranges will be shown below.

| (Preferred optical glass II-1) | |
|---|---|
| Optical glass II containing | |
| 17 to 30% | $P_2O_5$, |
| 30-60% | $Nb_2O_5$, |
| over 0% but not more than 20% | $TiO_2$, |
| 0 to 12% | $WO_3$ |
| 0 to 15% | $Bi_2O_3$ |
| the $TiO_2/(Nb_2O_5 + TiO_2 + WO_3 + Bi_2O_3)$ weight ratio being 0.11 or more, | |
| 0-3% | $SiO_2$, |
| 1-8% | $B_2O_3$, |
| 0-12% | $Na_2O$, |
| 0-10% | $K_2O$, |
| over 0% but not more than 25% | BaO, and |
| 0-5% | ZnO, | over 0% but not more than 1%, based on the total content of the above components, of $Sb_2O_3$ being added.

| (Preferred optical glass II-2) | |
|---|---|
| Optical glass II containing | |
| 18 to 28% | $P_2O_5$, |
| 32-57% | $Nb_2O_5$, |
| over 0% but not more than 20% | $TiO_2$, |
| 0 to 12% | $WO_3$ |
| 0 to 15% | $Bi_2O_3$ |
| the $TiO_2/(Nb_2O_5 + TiO_2 + WO_3 + Bi_2O_3)$ weight ratio being 0.11 or more, | |
| 0.2 to 20% | BaO, |
| 0-3% | $Li_2O$, |
| 0-10% | $Na_2O$, |
| 0-9% | $K_2O$, |
| the total content of $Li_2O$, $Na_2O$ and $K_2O$ being 15% or less, | |
| 0-6% | CaO, |
| 0-6% | SrO, |
| 0-5% | ZnO, |
| 1-6.5% | $B_2O_3$, |
| 0-2% | $SiO_2$, and |
| 0-2% | $ZrO_2$. |

(Preferred optical glass II-3)

Optical glass II containing

| | |
|---|---|
| 21 to 28% | $P_2O_5$, |
| 40-57% | $Nb_2O_5$, |
| 0.5-19% | $TiO_2$, |
| 0 to 12% | $WO_3$ |
| 0 to 15% | $Bi_2O_3$ | the $TiO_2/(Nb_2O_5 + TiO_2 + WO_3 + Bi_2O_3)$ weight ratio being 0.14 or more,

| | |
|---|---|
| 0.2 to 10% | BaO, |
| 0-1% | $Li_2O$, |
| 0-10% | $Na_2O$, |
| 0-9% | $K_2O$, | the total content of $Li_2O$, $Na_2O$ and $K_2O$ being 2 to 12%,

| | |
|---|---|
| 0-3% | CaO, |
| 0-3% | SrO, |
| 0-3% | ZnO, |
| 1-6.5% | $B_2O_3$, |
| 0-2% | $SiO_2$, and |
| 0-2% | $ZrO_2$. |

(Preferred optical glass II-4)

Optical glass II containing

| | |
|---|---|
| 21 to 28% | $P_2O_5$, |
| 45-57% | $Nb_2O_5$, |
| 2-18% | $TiO_2$, |
| 0 to 12% | $WO_3$ |
| 0 to 15% | $Bi_2O_3$ | the $TiO_2/(Nb_2O_5 + TiO_2 + WO_3 + Bi_2O_3)$ weight ratio being 0.15 or more,

| | |
|---|---|
| 0.2 to 6% | BaO, |
| 0-1% | $Li_2O$, |
| 0.1-10% | $Na_2O$, |
| 0.1-9% | $K_2O$, | the total content of $Li_2O$, $Na_2O$ and $K_2O$ being 2 to 10%,

| | |
|---|---|
| 0-3% | CaO, |
| 0-3% | SrO, |
| 0-3% | ZnO, |
| 1-6.5% | $B_2O_3$, |
| 0-2% | $SiO_2$, and |
| 0-2% | $ZrO_2$. |

(Preferred Optical Glass II-5)

Optical glass II-4 containing 0.2 to 5% of BaO.

For satisfying the above various requirements, the total content of $P_2O_5$, $Nb_2O_5$, $TiO_2$, BaO, $B_2O_3$, $Na_2O$, $K_2O$, $SiO_2$, $WO_3$ and $Bi_2O_3$ is preferably 95% or more, more preferably 98% or more, still more preferably 99% or more, particularly preferably 100%. The content of $Sb_2O_3$ is a content calculated on the basis of the total content of all of glass components excluding $Sb_2O_3$, and it is hence not included in the above total content.

Further, containing the specified content of $Sb_2O_3$, the optical glass of the present invention can be obtained as an optical glass having the above light transmittance in a state where a molten glass thereof is shaped and cooled. That is, the optical glass of the present invention has a composition that exhibits the above light transmittance in a state where a molten glass thereof is shaped and cooled. Therefore, the optical glass of the present invention can be imparted with the above light transmittance, without heat-treating the glass (for example, re-heating the glass to a temperature higher than the temperature that is 100° C. lower than the glass transition temperature thereof) after a shaped glass thereof is once cooled to solidness.

When a conventional glass is heat-treated for decreasing its coloring, it may be difficult to uniformly decrease the coloring of the entire glass due to the size and form of the glass to be heat-treated or the atmosphere employed for the heat treatment. For example, there may be caused a problem that the color degree of central portion of a glass is greater than that of a portion near the glass surface. When such a glass is used to make an optical element such as lens, the transmittance differs depending upon portions through which light passes, so that the optical element may be caused to have a malfunction. The problem of this type is aggravated by an increase in the size of the glass. However, the optical glass of the present invention has an excellent light transmittance without being heat-treated, so that it is not necessary to pay attention to the above problem.

Further, desirably, the optical glass of the present invention has a liquidus temperature of 1,150° C. or lower. When the glass has stability in the above high-temperature region, the glass is more improved in shapeability when the glass in a molten state is shaped into a shaped material.

Further, the optical glass of the present invention has a glass viscosity in the viscosity range suitable for shaping the molten glass thereof, so that there can be provided an optical glass having excellent high-temperature shapeability.

The optical glass having the above composition, provided by the present invention, can be produced as follows.

Concerning glass raw materials for producing the optical glass of the present invention, orthophosphoric acid ($H_3PO_4$), metaphosphoric acid, diphosphorus pentoxide, etc., can be used for $P_2O_5$, and carbonates, nitrates, oxides, etc., can be used for the other components. These raw materials are weighed and mixed as predetermined, to prepare a formulated raw material. The formulated raw material is charged into a melting furnace heated at approximately 1,000 to 1,250° C., melted, clarified and then stirred to homogenize it. Then, the homogenized material is cast into a mold and gradually cooled, whereby the optical glass of the present invention can be obtained.

In this case, oxygen may be added to the atmosphere in the melting furnace, to increase the oxygen partial pressure. Further, an oxidizing gas such as oxygen gas may be blown into the melting furnace for bubbling. In this manner, a high-refractivity glass having the excellent transmittance property can be produced.

The shaped glass material for press-molding, provided by the present invention, and the method for producing the same, will be explained below.

The shaped glass material for press-molding refers to a glass material that is to be press-molded, and it has a mass substantially equivalent to the mass of a press-molded article and is formed of the optical glass of the present invention.

First, a fully clarified and homogenized molten glass is caused to continuously flow out of a flow pipe, and it is caused to flow into a mold. The molten glass that is cast into the mold and spread in the form of a plate is solidified by cooling to form a plate glass. The thus-formed plate glass is continuously withdrawn from the mold, whereby a plate glass having a constant width and a constant thickness can be obtained. This glass is annealed to decrease strains, and then cut in desired dimensions, to prepare a plurality of glass pieces called cut pieces. Each cut piece is subjected to processing such as barrel-polishing, etc., to adjust it so that it has a mass equivalent to the mass of a press-molded product, whereby the shaped glass material for press-molding is obtained. Since the above shaped glass material for press-molding is made from the plate glass having a constant light transmittance, shaped glass materials having constant light transmittances can be easily obtained.

There may be employed another method in which a molten glass having a predetermined weight is separated from the molten glass that is flowing out, and it is received with a shaping mold and shaped into a glass gob, whereby the shaped glass material for press-molding is obtained. In this method, the glass gob may be subjected to processing such as barrel polishing to finish the shaped glass material for press-molding, or the above separated molten glass gob may be shaped into the shaped material while a gas pressure is applied to the glass above said shaping mold.

The optical element of the present invention and the process for producing the same will be explained below.

The optical element of the present invention is formed of the above optical glass. Examples of the optical element of the present invention include a lens, a prism, an optical substrate, and the like. Examples of the lens include various lenses such as a spherical lens, an aspherical lens, a lens array, and the like. Having a high refractive index, the optical glass of the present invention is suitable particularly for an image-sensing lens for a digital still camera, an image-sensing lens for a digital video camera, an image-sensing lens of a camera integrated into a cellular phone, an image-sensing lens of a camera integrated into a notebook size personal computer, a lens inside a projector of a liquid crystal projector such as a projector lens, or the like.

The process for producing an optical element, provided by the present invention, comprises heating the above shaped glass material for press-molding to soften it and press-molding the same. Examples of the process for producing an optical element, provided by the present invention, include a process in which the shaped glass material having a smooth surface for press-molding is softened under heat and precision-press-molded with a press mold in a non-oxidizing atmosphere containing nitrogen or a gas mixture of nitrogen with hydrogen, and a process in which the shaped glass material for press-molding is softened under heat in atmosphere and press-molded with a press mold and the press-molded product is grinded and polished to make an optical element.

Both the shaped glass material for press-molding and the optical element, provided by the present invention, are formed of the optical glass having little coloring, so that they have little coloring. Further, they have a high refractive index and has the property of high dispersion, so that they are high utility values.

EXAMPLES

The present invention will be explained further in detail with reference to Examples hereinafter, while the present invention shall not be limited by these Examples.

In Examples, optical glasses were measured for physical properties by the following methods.

(1) Refractive Index (nd) and Abbe's Number (vd)

An optical glass cooled at a temperature-decrease rate of 30° C. per hour was measured.

(2) Liquidus Temperature (LT)

An optical glass was placed in a 50 ml crucible made of platinum, the crucible was covered and then held in a furnace for 2 hours. The crucible with the glass in it was cooled, and then, an inside of the glass was observed through a microscope of 100 magnifications. A liquidus temperature was determined on the basis of whether or not a crystal was present therein.

(3) $\lambda_{70}$

In spectral transmittance measured according to the method described above in the present specification, a wavelength at which the transmittance was 70% was determined to be $\lambda_{70}$.

Examples 1-14

Optical glasses in Examples 1 to 14 were prepared according to a conventional method so that they had compositions shown in Tables 1 and 2. That is, in each Example, orthophosphoric acid ($H_3PO_4$), metaphosphoric acid, diphosphorus pentoxide, etc., were used as a raw material for $P_2O_5$, and carbonates, nitrates, oxides, etc., were used as raw materials for the other components. Predetermined amounts of these raw materials were weighed and mixed to prepare a formulated raw material, and the formulated raw material was charged into a melting furnace heated to 1,000 to 1,250° C., melted, clarified and then stirred to form a homogeneous material. Then, the homogeneous material was cast into a mold, and the cast product was gradually cooled to give an optical glass. The oxygen partial pressure in the melting atmosphere may be adjusted to a pressure higher than the oxygen partial pressure in atmosphere, and oxygen gas may be bubbled in the molten glass in the melting furnace.

Tables 1 and 2 show optical performances of the thus-obtained optical glasses.

Tables 1 and 2 show that the optical glass obtained in Examples 1 to 14 exhibited 500 nm or less as $\lambda_{70}$, had the property of high refractivity represented by a high refractive index (nd) of 1.91 or more, and had the property of high dispersion represented by an Abbe's number (vd) of 21 or less. Further, they had a liquidus temperature of 1,150° C. or lower. In addition, glasses in a state where the molten glasses were cooled to solidness (in a state where the glasses were not re-heated) exhibited 500 nm or less as $\lambda_{70}$.

Comparative Example 1

An optical glass having a composition shown in Table 2 was prepared in the same manner as in Examples 1 to 14. Table 2 shows the optical performances of the optical glass.

In Comparative Example 1, the optical glass contained $Sb_2O_3$, but its content was small. The optical glass obtained in the same manner as in Examples 1 to 14 was intensely colored, and the $\lambda_{70}$ thereof shifted toward the long wavelength side and exceeded the $\lambda_{70}$ specified in the present invention.

TABLE 1

| | | Example | | | | | | | |
|---|---|---|---|---|---|---|---|---|---|
| | | 1 | 2 | 3 | 4 | 5 | 6 | 7 | 8 |
| Glass composition (wt %) | $P_2O_5$ | 19.5 | 20.0 | 25.5 | 22.0 | 23.5 | 17.0 | 23.0 | 24.0 |
| | $SiO_2$ | — | — | 0.5 | — | 1.0 | — | — | 0.5 |
| | $B_2O_3$ | 2.5 | 3.0 | 2.0 | 5.5 | 2.5 | 1.5 | 0.5 | 2.0 |
| | $TiO_2$ | 16.0 | 12.0 | 15.0 | 13.5 | 13.0 | 7.0 | 14.0 | 13.0 |
| | $Nb_2O_5$ | 37.5 | 44.5 | 47.0 | 48.5 | 48.0 | 48.0 | 50.5 | 49.0 |
| | $Na_2O$ | 2.0 | 2.5 | 4.5 | 4.0 | 1.5 | 4.0 | 10.0 | 6.0 |
| | $K_2O$ | 2.0 | 2.0 | 4.0 | 2.0 | 9.0 | 4.0 | — | 2.0 |
| | CaO | — | — | — | — | — | — | — | — |
| | SrO | — | — | — | — | — | — | — | 1.5 |
| | BaO | 20.5 | 14.0 | 1.5 | 4.5 | 1.5 | 17.5 | 2.0 | 2.0 |
| | ZnO | — | 2.0 | — | — | — | — | — | — |
| | $ZrO_2$ | — | — | — | — | — | 1.0 | — | — |
| | $Sb_2O_3$ | 0.75 | 0.20 | 0.30 | 0.50 | 0.30 | 0.15 | 0.15 | 0.20 |
| | Other | | | | | | | | |
| Property values | nd | 1.9516 | 1.9542 | 1.9459 | 1.9456 | 1.9270 | 1.9246 | 1.9504 | 1.9411 |
| | νd | 19.5 | 19.2 | 17.9 | 18.2 | 18.4 | 20.8 | 18.1 | 18.3 |
| | λ70 (nm) | 468 | 450 | 463 | 459 | 454 | 446 | 446 | 451 |
| | L.T. (° C.) | 1100 | 1100 | 1100 | 1080 | 1060 | 1080 | 1140 | 1080 |
| | $TiO_2/(Nb_2O_5 + TiO_2 + WO_3 + Bi_2O_3)$ [weight ratio] | 0.299 | 0.212 | 0.242 | 0.218 | 0.213 | 0.127 | 0.217 | 0.210 |

L.T. = Liquidus temperature

TABLE 2

| | | Example | | | | | | Comparative |
|---|---|---|---|---|---|---|---|---|
| | | 9 | 10 | 11 | 12 | 13 | 14 | Example 1 |
| Glass composition (wt %) | $P_2O_5$ | 19.5 | 18.5 | 23.5 | 27.0 | 18.5 | 20.5 | 22.5 |
| | $SiO_2$ | — | — | 0.5 | — | — | — | — |
| | $B_2O_3$ | 3.0 | 2.5 | 2.5 | 1.0 | 2.5 | 1.5 | 2.5 |
| | $TiO_2$ | 8.5 | 6.5 | 12.5 | 13.5 | 6.5 | 13.5 | 10.0 |
| | $Nb_2O_5$ | 45.5 | 40.5 | 48.5 | 48.5 | 49.0 | 45.0 | 55.0 |
| | $Na_2O$ | 2.5 | 3.5 | 6.0 | 5.5 | 2.0 | 4.0 | — |
| | $K_2O$ | 4.5 | 1.0 | 2.5 | 2.5 | 2.0 | 3.5 | 10.0 |
| | CaO | 1.0 | — | — | — | — | — | — |
| | SrO | — | — | — | — | — | — | — |
| | BaO | 15.5 | 19.0 | 1.0 | 2.0 | 19.5 | 1.5 | — |
| | ZnO | — | — | — | — | — | — | — |
| | $ZrO_2$ | — | — | — | — | — | — | — |
| | $Sb_2O_3$ | 0.20 | 0.15 | 0.30 | 0.40 | 0.11 | 0.30 | 0.01 |
| | Other | | $Bi_2O_3$: 8.5 | $WO_3$: 3.0 | | | $WO_3$: 10.5 | |
| Property values | nd | 1.9186 | 1.9329 | 1.9427 | 1.9333 | 1.9538 | 1.9776 | 1.9376 |
| | νd | 20.6 | 20.9 | 18.2 | 18.2 | 20.1 | 17.3 | 18.4 |
| | λ70 (nm) | 438 | 458 | 457 | 458 | 445 | 483 | 615 |
| | L.T. (° C.) | 1100 | 1080 | 1120 | 1080 | 1120 | 1130 | — |
| | $TiO_2/(Nb_2O_5 + TiO_2 + WO_3 + Bi_2O_3)$ [weight ratio] | 0.157 | 0.117 | 0.195 | 0.218 | 0.117 | 0.196 | 0.154 |

L.T. = Liquidus temperature

Example 15

Molten glasses were caused to flow out at a constant rate and cast into a mold, respectively, to form glass plates formed of the optical glasses of Examples 1 to 14. Each glass plate was annealed for decreasing strains and then cut to predetermined dimensions to prepare cut pieces. A plurality of cut pieces of each of the optical glasses of Examples 1 to 14 were barrel-polished to adjust their masses to the mass of an intended product to be obtained by press-molding. A powder mold release agent was uniformly applied to the entire surface of each of the thus-obtained shaped glass materials for press-molding, and each shaped glass material was softened under heat in atmosphere and press-molded into a form similar to an intended lens with a press mold.

The thus-obtained press-molded products were annealed, and then, they were grinded and polished to produce lenses formed of the glasses of Examples 1 to 14. The thus-obtained lenses were visually observed to show little coloring.

While this Example explains the lenses as an example, other optical elements such as a prism, an optical substrate, etc., can be similarly produced as well.

INDUSTRIAL UTILITY

The optical glass of the present invention has high-refractivity and high-dispersion properties and has little coloring, and it can be suitably applied to a shaped glass material for press-molding and various optical elements.

The invention claimed is:

1. A process for producing an optical element, which comprises softening a shaped glass material for press-molding under heat and press-molding the shaped glass material, said shaped glass material being formed of the optical glass comprising, by weight %, 17 to 30% $P_2O_5$, 30 to 60% $Nb_2O_5$ and over 0% but not more than 20% $TiO_2$ as glass components, and containing $Sb_2O_3$ in an amount of over 0% by weight but not more than 1% by weight based on the total content of the glass components excluding $Sb_2O_3$, and $WO_3$ and $Bi_2O_3$ as optional components with a $TiO_2/(Nb_2O_5+TiO_2+WO_3+Bi_2O_3)$ weight ratio of 0.11 or more, having a refractive index (nd) of 1.91 or more and an Abbe's number (vd) of 21 or less and having a light transmittance that comes to be 70% at a wavelength of 500 nm or less.

2. A lens or a prism, which is formed of the optical glass comprising, by weight %, 17 to 30% $P_2O_5$, 30 to 60% $Nb_2O_5$ and over 0% but not more than 20% $TiO_2$ as glass components, and containing $Sb_2O_3$ in an amount of over 0% by weight but not more than 1% by weight based on the total content of the glass components excluding $Sb_2O_3$, and $WO_3$ and $Bi_2O_3$ as optional components with a $TiO_2/(Nb_2O_5+TiO_2+WO_3+Bi_2O_3)$ weight ratio of 0.11 or more, having a refractive index (nd) of 1.91 or more and an Abbe's number (vd) of 21 or less and having a light transmittance that comes to be 70% at a wavelength of 500 nm or less.

3. The process of claim 2, in which the optical glass further contains, by weight %, 0 to 3% of $SiO_2$, 1 to 8% of $B_2O_3$, 0 to 12% of $Na_2O$, 0 to 10% of $K_2O$, over 0% but not more than 25% of BaO and 0 to 5% of ZnO.

4. The process of claim 1, in which the optical glass contains $Sb_2O_3$ in an amount of over 0.1% by weight but not more than 1% by weight based on the total content of the glass components excluding $Sb_2O_3$.

5. The lens or prism of claim 2, in which the optical glass further contains, by weight %, 0 to 3% of $SiO_2$, 1 to 8% of $B_2O_3$, 0 to 12% of $Na_2O$, 0 to 10% of $K_2O$, over 0% but not more than 25% of BaO and 0 to 5% of ZnO.

6. The lens or prism of claim 2, in which the optical glass contains $Sb_2O_3$ in an amount of over 0.1% by weight but not more than 1% by weight based on the total content of the glass components excluding $Sb_2O_3$.

* * * * *